Sept. 11, 1923.

G. A. TOOMEY

MEASURING INSTRUMENT

Filed Oct. 13, 1920

Inventor

George A. Toomey

Sept. 11, 1923.

G. A. TOOMEY 1,467,403

MEASURING INSTRUMENT

Filed Oct. 13, 1920

Inventor
George A. Toomey

Sept. 11, 1923.

G. A. TOOMEY 1,467,403

MEASURING INSTRUMENT

Filed Oct. 13, 1920

Inventor

George A. Toomey

Patented Sept. 11, 1923.

1,467,403

UNITED STATES PATENT OFFICE.

GEORGE A. TOOMEY, OF SPRINGFIELD, MASSACHUSETTS.

MEASURING INSTRUMENT.

Application filed October 13, 1920. Serial No. 416,753.

(FILED UNDER THE ACT OF MARCH 3, 1883, 22 STAT. L., 625.)

*To all whom it may concern:*

Be it known that I, GEORGE A. TOOMEY, a citizen of the United States, and a resident of Springfield, county of Hampden, and State of Massachusetts, have invented an Improvement in Measuring Instruments, of which the following is a specification.

The invention described herein may be used by the Government, or any of its officers or employees in prosecution of work for the Government, or by any other persons in the United States, without payment to me of any royalty thereon.

The subject of this invention is a measuring instrument designed more especially for the accurate measurement of gauges, tools, templates, arcs, angles, threads, irregular curves, etc.

The main object of the invention is the provision of adjustable means for supporting an object to be measured associated with adjustable sighting means for accurately determining selected points on such object.

The invention also contemplates a provision of means for determining the relative positions of such selected points.

With these and other objects in view the invention resides in the novel arrangement and combination of parts and details of construction hereinafter described and claimed, it being understood that changes in the precise embodiment of the invention herein disclosed may be made within the scope of what is claimed without departing from the spirit of the invention.

A practical embodiment of the invention is shown in the accompanying drawings, wherein.

Figure 1:
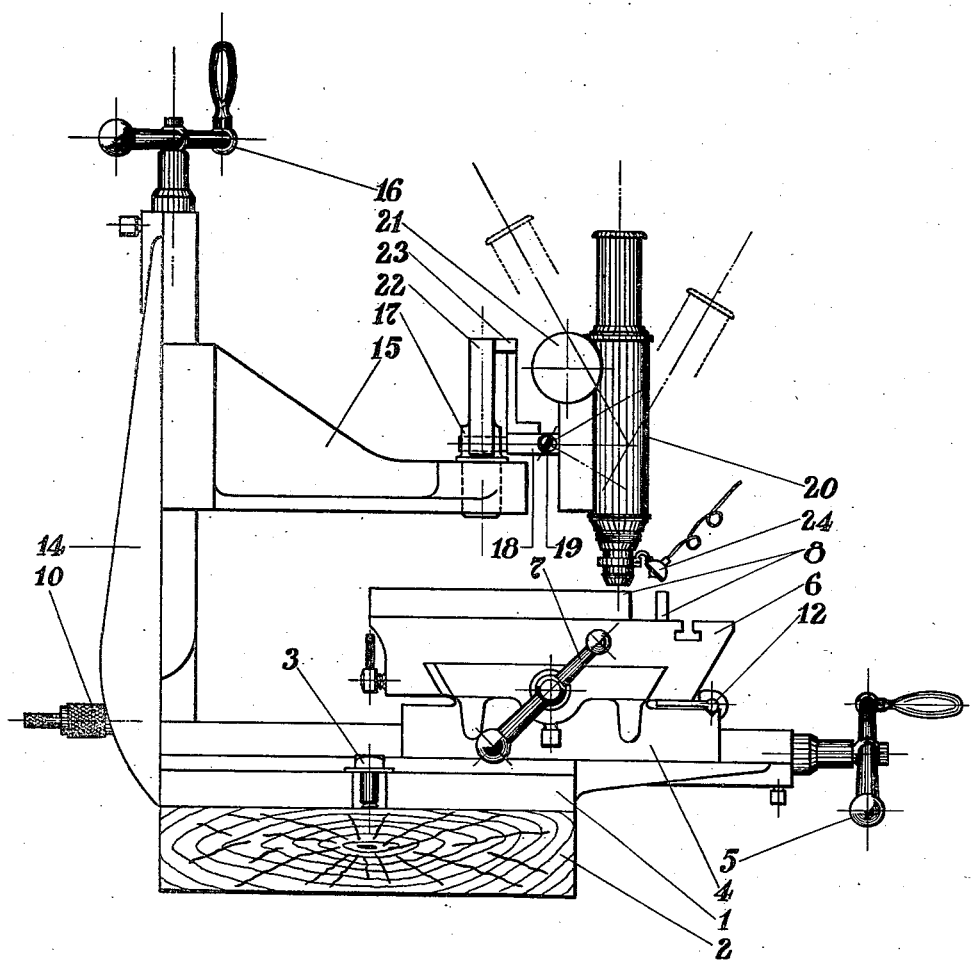
Fig. 1 is a side elevation of a device constructed in accordance with the invention.
Figure 2:
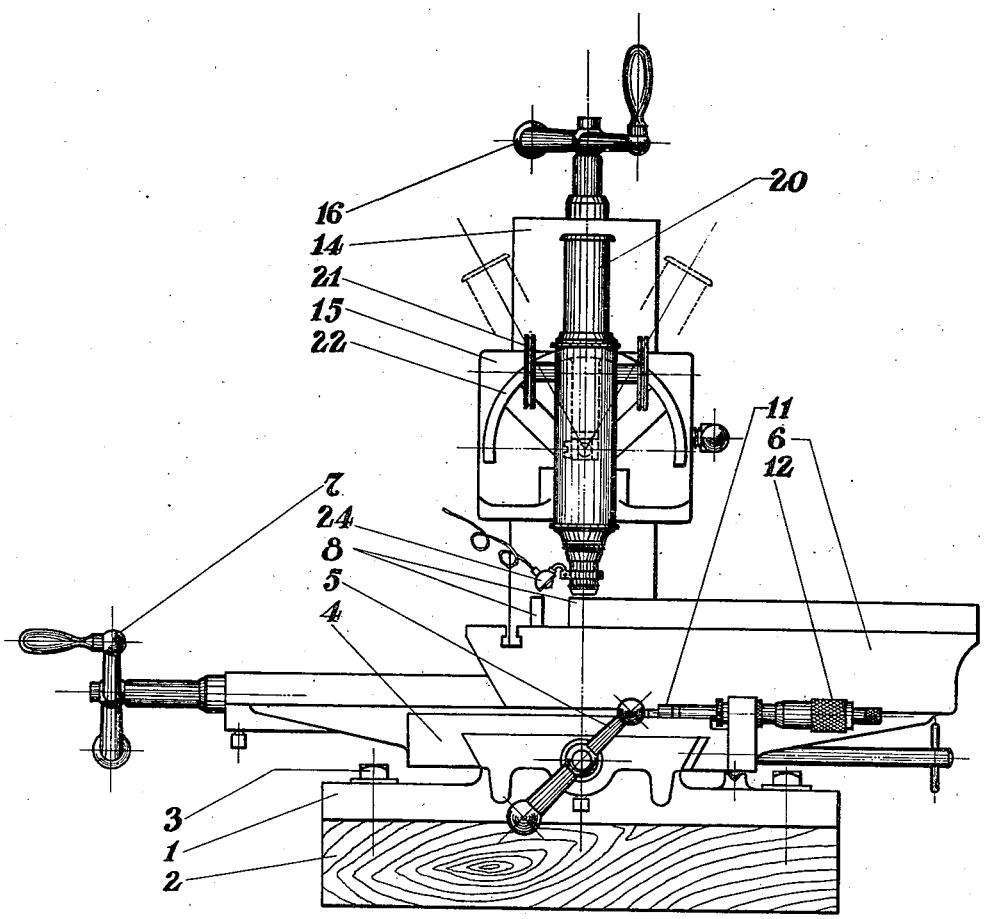
Fig. 2 is a front elevation of the same.
Figure 3:
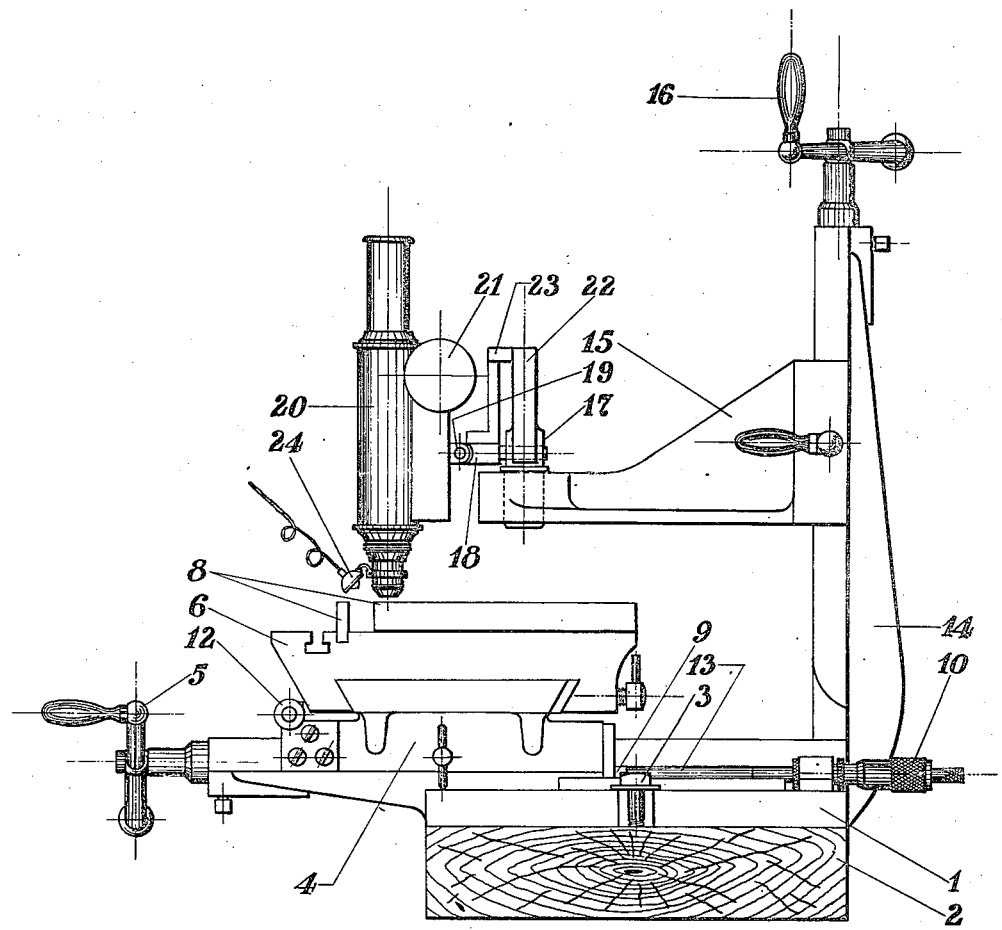
Fig. 3 is a side elevation, viewed from the opposite side to that shown in Fig. 1.
Figure 4:
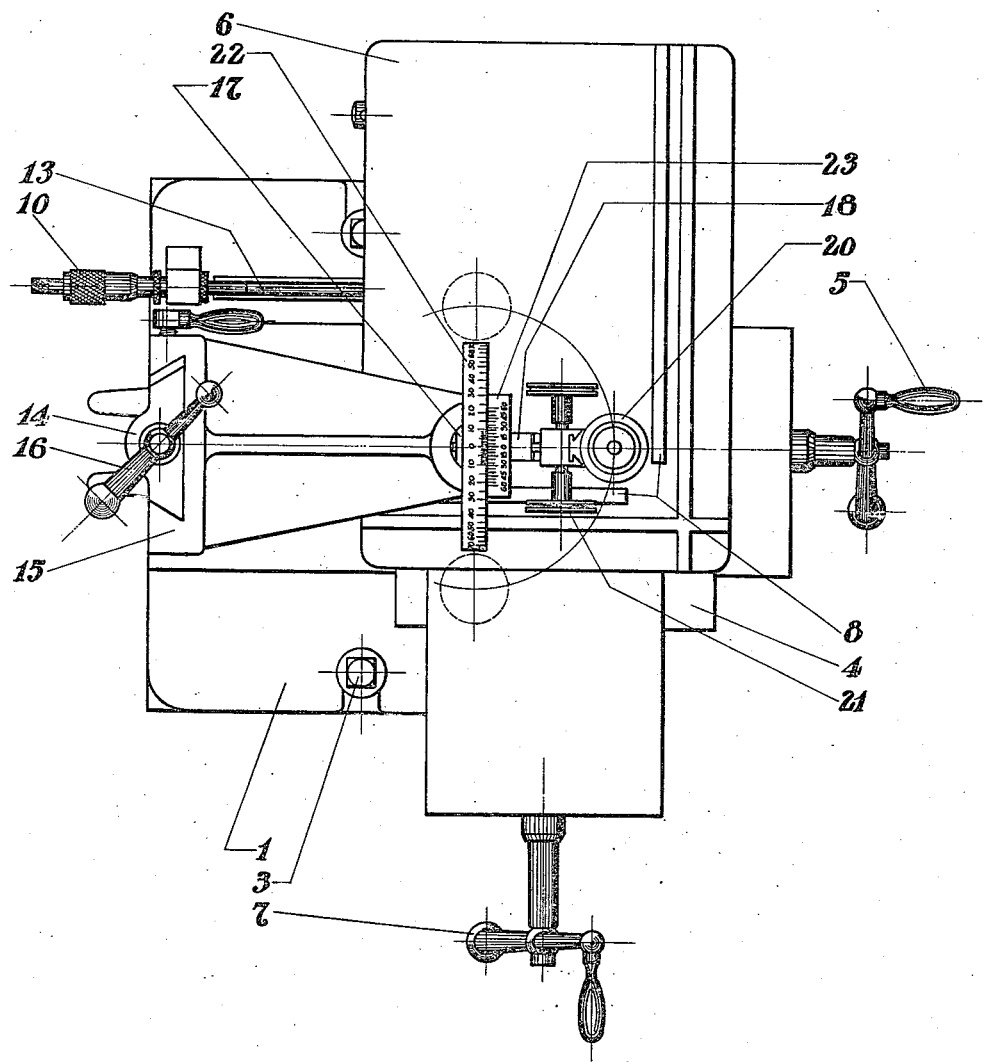
Fig. 4 is a plan view.

Referring to the drawings by numerals of reference: The device consists of a bed plate 1 which may be secured to a suitable support 2 by means of screws 3 or in any other convenient manner. The bedplate 1 is formed to receive, with a close slide fit, a plate 4 which is adjustable longitudinally of the bedplate 1 through means of an adjusting screw operated through a hand lever or handle 5 in the usual and well known manner.

The plate 4 is formed to receive, with a close slide fit, a rest 6 which is adjustable longitudinally of said plate by a screw operated by the handle 7.

The rest 6 may be provided with suitable holding and positioning means for the work to be placed thereon, such as the bars 8.

For the purpose of determining the amount of displacement of the rest in either direction, a lug 9 is formed on the plate 4 and is positioned to move in line with the axis, extended, of a micrometer or like measuring device 10 which is suitably mounted on the bedplate 1, and a similar lug 11 is provided on the rest 6 and bears a like relation to a micrometer or other measuring instrument 12 mounted on the plate 4. If desired, Johansson blocks 13 or similar accurate measuring devices may be interposed between the lugs 9 and 11 and measuring devices 10 and 12.

Rising from the rear end of the plate 1, and preferably at right angles thereto, is a support 14 carrying an arm 15 movable longitudinally thereof by means of a screw operated by the handle 16, the arm being positioned to overhang the adjustable rest.

Pivotally mounted in the free end of the arm 15 is a block 17 capable of turning about a vertical axis. The block 17 is bored to receive with a close sliding fit the reduced end of rod 18 which turns in said block about its horizontally disposed longitudinal axis, and pivotally secured to the extending free end of the rod 18, as by means of a pivot pin 19, is a sighting instrument herein shown as a microscope 20, provided with knurled thumb wheels 21 by which the microscope may be adjusted to properly focus the same.

By reason of such mounting the microscope may be brought to any desired angular position about the axis of the block 17 to bring the microscope to bear on any part of the table or rest, also to any desired angular position with respect to a vertical plane including the axis of the rod 18 and likewise, by adjustment about the pivot pin 19 to any desired angular position within said plane. By this latter adjustment a ready means is afforded of securing the angular measurement between points.

For the purpose of readily determining the angular displacement of the microscope graduated arcs 22 and 23 may be provided and suitably secured to the arm 15, the graduations of such arcs preferably being in degrees, minutes and seconds.

To render an object to be measured readily visible, especially when such object contains depressions as in the case of a screw thread, a reflector 24 may be attached to the microscope to direct the rays of light from an electric bulb or similar light source upon the work.

In practice the invention is used in the following manner:

The object to be measured is placed upon the compound rest and may be positioned by means of bars 8, being held on the rest by its own weight or by any desired form of mechanical or electrical clamp, not shown. The compound rest is then moved by means of the proper screw until the object to be measured is in the desired position under the microscope. The inter-section of the fine cross hairs or lines is then brought into focus and coincidence with one of the points on the object from which measurement or measurements are to be made.

The relative position of the compound rest may be noted by taking the reading of the micrometer or similar indicating device which has been brought into contact with one of the lugs or projections 9 or 11 respectively as the case may be. The rest is then moved until the intersection of the cross hairs of the microscope is brought into focus and coincidence with the next point to which measurement is to be made and the micrometer screw is again brought into contact with the lug or projection 9 or 11 respectively and the reading taken. The difference between the two readings is the required dimension when but one straight dimension is sought, that is, the distance between the two points above mentioned.

In measuring arcs, the arc to be measured is placed on the movable plate or compound rest and, with the same procedure as described above, for measuring a straight line, the chord of the arc is measured, and then the height of the arc measured and, with these two known quantities the radius of the arc is easily computed.

In measuring irregular curves, the method is as follows:

The point of intersection of the cross hairs or lines on the microscope is brought into coincidence with the highest point on the curve to be measured; a reading is then taken on one of the micrometer heads, depending upon which direction the compound rest has been or is to be moved. The object is then moved some definite distance and a measurement is then taken as described above for measuring a chord. This is continued until all measurements on the irregular curve required, are taken; then by simple subtraction each point may be located from the starting point. With this information in hand the curve may be plotted from predetermined points.

The method used for measuring irregular curves is also used for measuring threads of any form either to measure or plot the thread to determine how nearly the thread as machined compares with the theoretical curves and lines of the thread. The pitch or lead of the thread is measured in the same manner as a straight line.

When measuring the distance between points on an irregular surface it is sometimes necessary, in moving the object under the microscope to raise the microscope to prevent contact of the highest point of the irregular surface therewith. This is readily accomplished through the adjustable mounting of the arm 15 on the up-right 14, the arm being moved upwardly to allow the object to be moved under the microscope and then returned to its original position to properly focus the microscope upon the next succeeding point on the object.

Having described my invention what I claim as new and desire to secure by Letters Patent is:

1. A measuring device including, a bed plate, a plate slidable longitudinally of the bed plate, a lug formed on the plate, means carried by the bed plate and engaging the slidable plate for moving the same longitudinally of the bed plate, a rest mounted on the slidable plate and slidable longitudinaly thereof, a lug formed on the rest, means carried by the slidable plate and engaging the rest for moving the rest longitudinally of the plate, a measuring device carried by the bed plate and engageable with the lug on the slidable plate for measuring the movement of the slidable plate with respect to the bed plate, a measuring device carried by the slidable plate and engageable with the lug carried by the rest for measuring the movement of the rest with respect to the slidable plate, a support rising from the bed plate and disposed at right angles thereto, an arm carried by the support and adjustable longitudinally thereof, means on the support and engaging the arm for adjusting the arm longitudinally of the support, a block pivotally mounted in the free end of the arm and adapted to swing about a vertical axis, a rod, mounted in the block and adapted to swing about a horizontal axis, a microscope pivotally secured to the extending free end of the rod, means connected to the arm for determining the angular displacement of the microscope with respect to the arm, and a reflector secured by the microscope and adapted to direct rays of light upon an object to be measured.

2. A measuring device, including a bed plate, a rest adjustable longitudinally and laterally of the bed plate, means for adjusting the rest, means for measuring the amount of adjustment of the rest, a microscope overlying the rest and a connection between the microscope and bed plate including means for adjusting the microscope toward and away from the rest, said microscope adjustable in a horizontal plane to bring the same above desired points on the rest and adjustable to angular positions with respect to the rest.

GEORGE A. TOOMEY.